United States Patent [19]

Mihara et al.

[11] Patent Number: 5,023,414
[45] Date of Patent: Jun. 11, 1991

[54] ELECTRICAL SWITCH FOR DETECTING POSITIONS OF AN AUTOMATIC TRANSMISSION OF AN AUTOMOBILE

[75] Inventors: Haruhiko Mihara; Norihiro Ida; Tetsuya Hamaoka, all of Kadoma, Japan

[73] Assignee: Matsushita Electric Works, Ltd., Japan

[21] Appl. No.: 492,465

[22] Filed: Mar. 13, 1990

[30] Foreign Application Priority Data

Mar. 28, 1989 [JP] Japan .................................. 1-75814[U]
Aug. 18, 1989 [JP] Japan ................................ 1-213712[U]
Aug. 18, 1989 [JP] Japan ................................ 1-213713[U]

[51] Int. Cl.$^5$ ........................ H01H 3/16; H01H 19/58
[52] U.S. Cl. ............................. 200/61.91; 200/11 A; 200/11 J
[58] Field of Search ............ 200/11 A, 11 D, 11 DA, 200/11 G, 11 J, 11 TW, 61.88, 61.89, 61.91

[56] References Cited

U.S. PATENT DOCUMENTS

| | | | |
|---|---|---|---|
| 1,934,368 | 11/1933 | Macy ................................. | 200/11 A |
| 3,437,766 | 4/1969 | Ahrens ........................... | 200/11 J X |
| 3,602,656 | 8/1971 | Graddy et al. .................... | 200/11 C |
| 3,794,784 | 2/1974 | Snider ............................. | 200/11 DA |
| 3,939,313 | 2/1976 | Hagashi et al. .................. | 200/61.89 |
| 4,172,218 | 10/1979 | Sugisaka .................... | 200/11 DA X |
| 4,275,279 | 6/1981 | Wagatsuma et al. ......... | 200/11 DA |
| 4,604,506 | 8/1986 | Gebhardt ......................... | 200/61.89 |
| 4,897,513 | 1/1990 | Oka et al. ....................... | 200/11 J X |
| 4,916,263 | 4/1990 | Ichigo ............................ | 200/11 DA |

FOREIGN PATENT DOCUMENTS

59-150115  6/1984  Japan .
59-150116  6/1984  Japan .
1-19772   7/1989  Japan .

*Primary Examiner*—J. R. Scott
*Attorney, Agent, or Firm*—Stevens, Davis, Miller & Mosher

[57] ABSTRACT

An electrical rotary switch in use with an automatic transmission for detecting the operative position of the transmission and controlling an electric circuit associated with the positions of the transmission. The switch comprises a switch casing composed of a base plate and a cover plate each formed of an electrically insulating material and provided in its interior surface with a plurality of fixed contacts. Supported between the base plate and the cover plate is an actuator which is rotatable about a rotation axis in response to the changing positions of the automatic transmission. The actuator has a coupling end to be interlocked with a control output shaft of the transmission which is provided to rotate in synchronism with changing positions of the transmission. The actuator has first and second opposed faces each confronting the interior surface of each one of the base plate and the cover plate, and carries first and second movable contacts respectively on the first and second faces for electrical conduction between selective ones of the fixed contacts on the individual plates depending upon a particular angular position of the actuator about the rotation axis. Also formed on the switch casing is a terminal assembly comprising a plurality of terminal pins leading from the individual fixed contacts for connection with the external electric circuits. The movable contacts are carried in slots in the actuator. A third moveable contact is used to energize the starter circuit when the park and neutral positions of the transmission are detected.

13 Claims, 6 Drawing Sheets

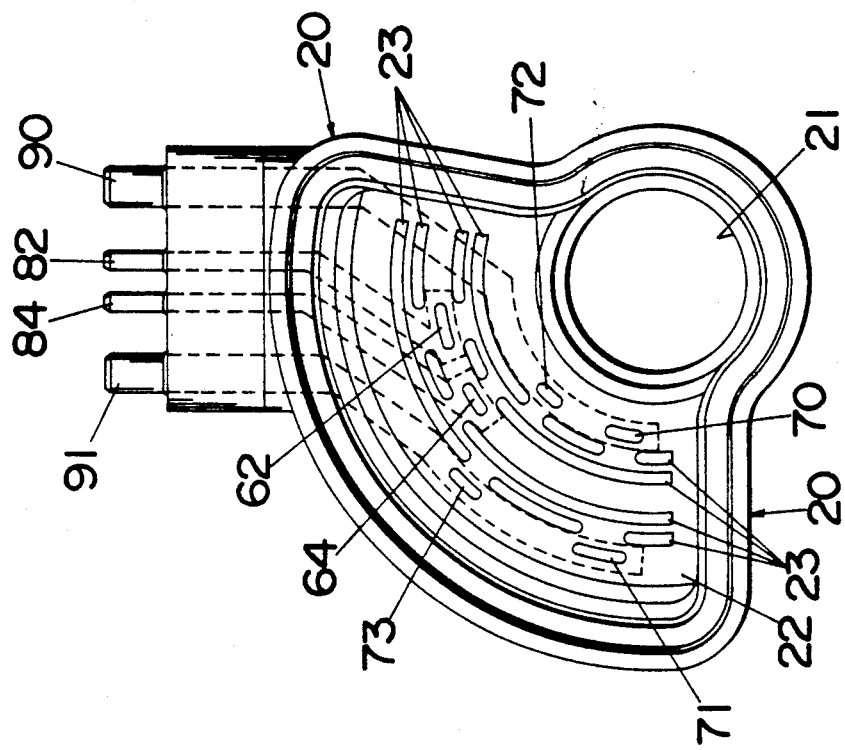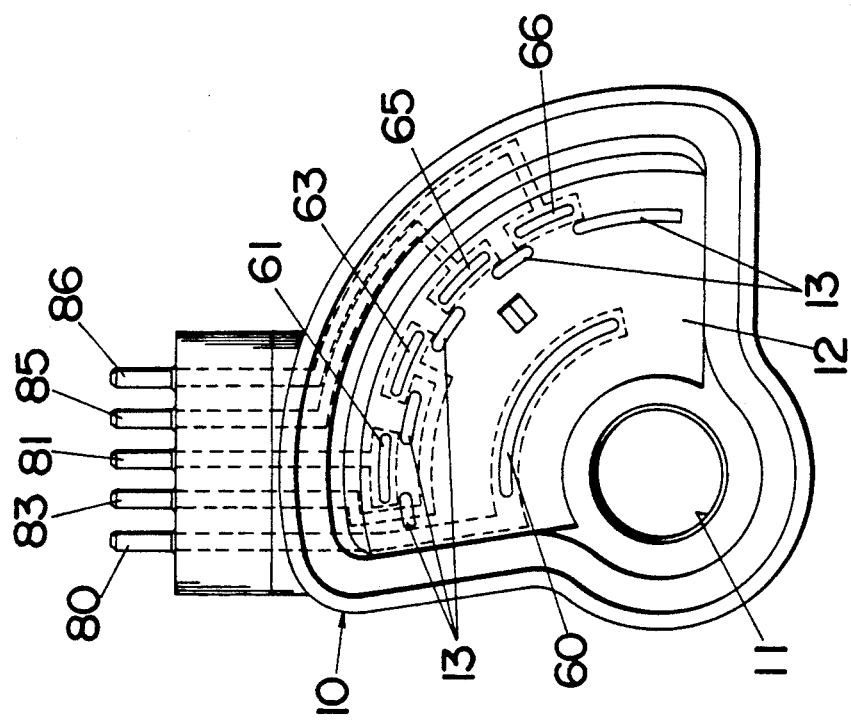

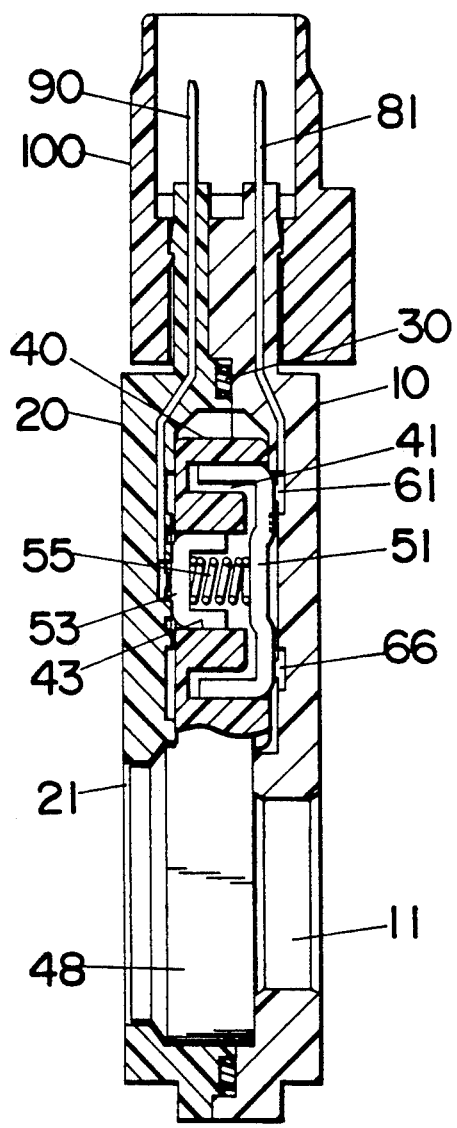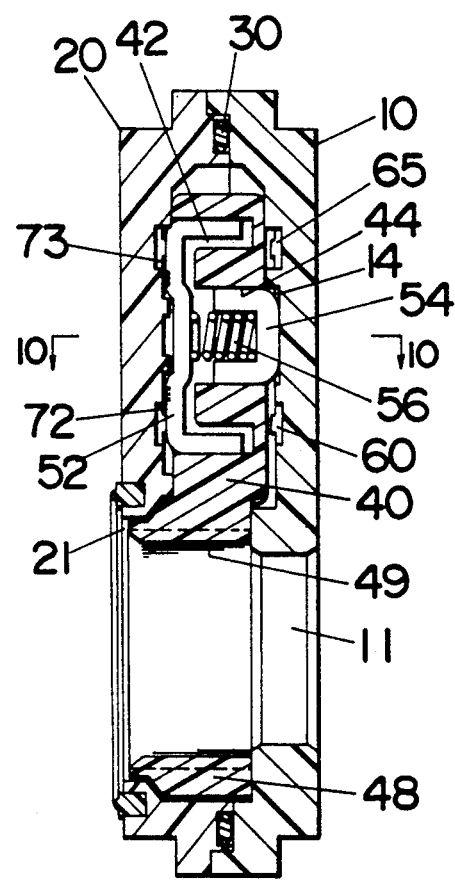

ELECTRICAL SWITCH FOR DETECTING POSITIONS OF AN AUTOMATIC TRANSMISSION OF AN AUTOMOBILE

BACKGROUND OF THE INVENTION

1. Field of the Invention

The present invention is directed to an electrical switch for use with an automatic transmission of an automobile, and more particularly to a rotary electrical switch which is in use to be interlocked with the automatic transmission for detecting the positions thereof and for controlling electric circuits associated with the positions of the automatic transmission.

2. Description of the Prior Art

Electrical control switches for an automatic transmission of an automobile have been known such as disclosed in Japanese Utility Model Publication (Kokoku) No. 1-19772 published on June 7, 1989 and in U.S. Pat. No. 3,602,656. The switch comprises a switch casing and an actuator which is interlocked with a control shaft of an automatic transmission to be rotatable together therewith. The switch casing is composed of a base plate and a cover plate which are coupled together to rotatably support the actuator therebetween. A plurality of fixed contacts are arranged on the interior of the base plate in correspondence to positions of the automatic transmission, i.e., "Parking", "Reverse", "Neutral", "Drive", "2nd", and "Low" positions. The actuator carries a movable contact which moves across the fixed contacts as the actuator rotates about a rotation axis for conduction between selective sets of the fixed contacts to energize or deenergize a corresponding one of electrical circuits or loads associated with the positions of the transmission. In prior art switches, however, the fixed contacts are disposed only on the side of the base plate, so that they should be arranged at positions spaced from the rotation axis of the actuator by a relatively greater distance in order to provide enough clearance between the adjacently disposed fixed contacts arranged circumferentially about the rotation axis. This arrangement will inevitably add an extra dimension to the base plate and therefore the switch housing itself, particularly with respect to the radial direction as measured from the rotation axis to the respective fixed contacts. Also with this arrangement of providing the fixed contacts only on the base plate, the base plate suffers from jamming of conductor members leading from the fixed contacts respectively to individual terminal pins, which also makes it difficult to attain a compact design of the switch of this kind. Thus, the prior electrical rotary switch is not satisfactory in providing a more compact design.

SUMMARY OF THE INVENTION

The above problem has been eliminated in the present invention which provides an improved electrical switch for detecting positions of an automatic transmission of an automobile. The electrical switch of the present invention comprises a switch casing composed of a base plate and a cover plate each formed of an electrically insulating material and provided in its interior surface with a plurality of fixed contacts. An actuator is rotatably supported between the base plate and cover plate for rotation about a rotation axis in response to the changing positions of the automatic transmission. To this end, the actuator has a coupling end to be interlocked with a control output shaft which is provided on the side of the transmission to rotate in synchronism with changing positions of the transmission. The actuator has first and second opposed faces each confronting the interior surface of each one of the base plate and the cover plate, and carries first and second movable contacts respectively on the first and second faces for electrical conduction between selective ones of the fixed contacts on the individual plates depending upon a particular angular position of the actuator about the rotation axis. Also formed on the switch casing is a terminal comprising a plurality of terminal pins leading from the individual fixed contacts for connection with the external electric circuits. With the provision of arranging the fixed contacts on both of the base and cover plates, the fixed contacts can be arranged about the rotation axis with some of the fixed contact on the base plate and the others on the opposite cover plate in such a manner that they can be positioned relatively close to the rotation axis without causing any substantial jamming between the adjacently disposed fixed contacts on the same plate, thereby assuring to reduce a maximum span required for spacing the fixed contacts from the axis of rotation.

Accordingly, it is a primary object of the present invention to provide an electrical switch which is capable of being made into compact design suitable for use in a limited space.

The base plate and the cover plates are bonded together to form a sealed space in which the fixed contacts and the movable contact are confined. In a preferred embodiment, the base and cover plates are made of plastic material and are assembled by ultrasonic bonding at mating surfaces thereof. Thus, the switch casing can be easily sealed for protection of the fixed and movable contacts from contaminated environment around the transmission in the automobile, which is therefore another object of the present invention.

The terminal pins are integrally connected to the fixed contacts respectively by way of bridge segments which are molded into the base and cover plates. Thus, no internal wiring is required between the fixed contacts and the corresponding terminal pins to facilitate the assembly of the switch. Further, in connection with the provision of arranging the fixed contacts on both of the base plate and cover plate, the bridge segments can be also correspondingly shared by the base and cover plates without causing jamming of the bridge segments in each of the plates, which also contributes to achieve a compact design of the switch.

It is therefore a further object of the present invention to provide an improved electrical switch in which the terminal pins can be integrally formed on the base and cover plate without requiring additional wiring between the terminal pins and the fixed contacts and in an optimum fashion to reduce the size of the switch.

The terminal pins, which include signal pins for carrying a relatively small current and hot pins for carrying a relatively large current, are arranged in two rows in such a manner that the hot pins are only seen in one of the rows and that the hot pins are spaced from the adjacent pins by a distance greater than that between the signal pins in the other row. With this terminal pin arrangement, enough electrical insulation distance is given to the hot pins for safety improvement, which is therefore a still further object of the present invention.

In a preferred embodiment, the actuator includes a third movable contact in addition to the first and second movable contacts. The third movable contact is arranged on the second face of the actuator in angularly spaced relation from the second movable contact to be engageable with at least one of the fixed contacts on the cover plate. The third movable contact is electrically connected to the first movable contact on the first face so that it cooperates therewith to effect conduction between ones of the fixed contacts belonging to both of the base and cover plates. Consequently, it is possible to effect conduction between suitable ones of the fixed contacts without being restricted by the separate arrangement of the fixed contacts on the base and cover plates.

It is therefore a further object of the present invention to provide an improved switch which is capable of increasing design flexibility in separately providing the fixed contacts on the base and cover plate, while assuring to obtain a suitable combination of the fixed contacts from the base and cover plates.

The actuator is provided with click means for releasably latching the actuator into one angular position so that the actuator can be connected to the control output shaft of the transmission as being positively held in that position, facilitating the matching of the positions of the switch and the transmission at the time of performing a driving joint between the actuator and the control output shaft of the automatic transmission.

It is therefore an object of the present invention to provide an improved switch for use with an automatic transmission which is capable of being easily coupled to the transmission.

These and still other objects and advantages of the present invention will become more apparent from the following description of a preferred embodiment when taken in conjunction with the attached drawings.

BRIEF DESCRIPTION OF THE DRAWING

FIG. 4 is a view showing the interior surface of a base plate of the switch;

FIG. 5 is a view showing the interior surface of a cover plate of the switch;

FIG 8 is a sectional view taken along line 8—8 of FIG. 1 with the actuator shown in position to extend along the line;

FIG. 9 is a sectional view taken along line 9—9 of FIG. 1 with the actuator shown in position to extend along the line;

DETAILED DESCRIPTION OF THE EMBODIMENT

Figure 11:
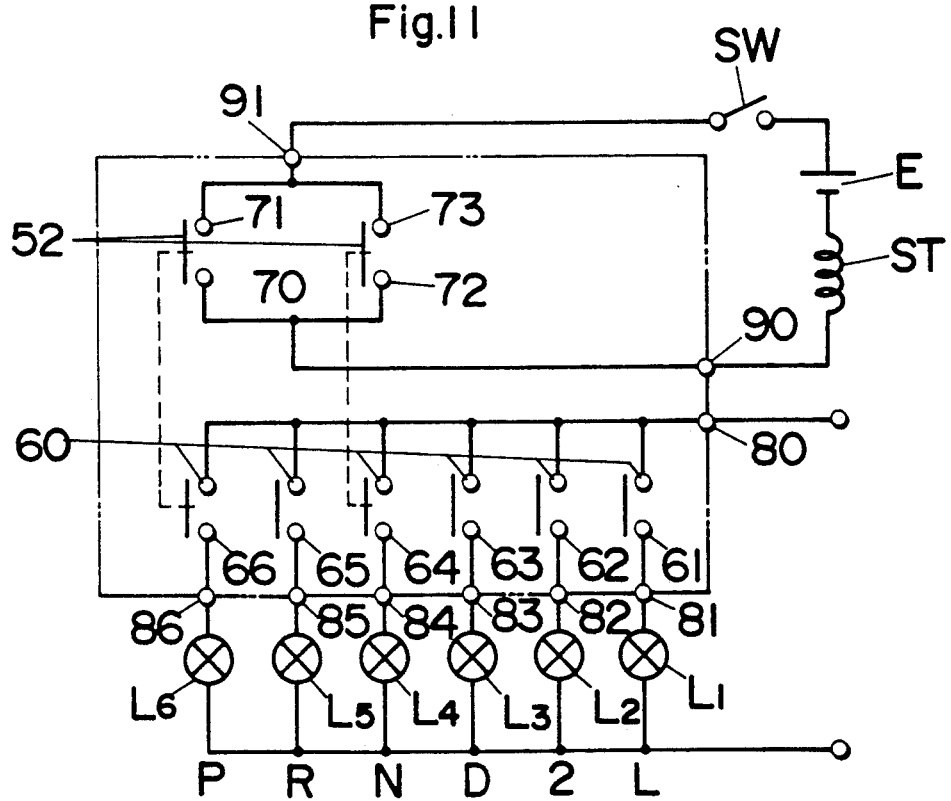
FIG. 11 is a schematic circuit diagram of the switch as connected with external circuits.

An electrical rotary switch in accordance with the present invention is adapted for in use with an automatic transmission of an automobile having a control output shaft which rotates in correspondence with the shift position of the transmission. The switch is designed to be installed on a housing of the transmission and is drivingly coupled to the control output shaft for detecting the shift position of the transmission to effect controls of electrical circuits provided in association with the shift positions of the transmission. In particular, the switch is utilized to inhibit the energization of an engine starter circuit unless the transmission is in "Parking" or "Neutral" position. Besides the above inhibiting operation, the switch is utilized to indicate the positions of the transmission selected, i.e., "Parking", "Reverse", "Neutral", "Drive", "2nd", and "Low" positions generally defined in the automatic transmission. For this purpose, the switch is connected to a starter circuit ST including a battery E and to a corresponding number of indicator circuits or loads $L_1$ to $L_6$, as shown in FIG. 11.

Referring to FIGS. 1 to 5, the switch comprises a switch casing composed of a base plate 10 and a cover plate 20 which are shaped from an electrically insulative plastic material into a generally symmetrical configuration having holes 11 and 21. The plates 10 and 20 are formed in their interior surfaces respectively with recesses 12 and 22 which cooperate to form a space for receiving an actuator 40 which is coupled to the control output shaft of the transmission to be movable therewith. The plates 10 and 20 are bonded together with an O-ring 30 interposed between the peripheries thereof to seal the interior space. For effectively and conveniently sealing the switch casing, an ultrasonic bonding technique is preferred in addition to the O-ring 30. The actuator 40 is provided at its end with a sleeve ring 48 which is journaled between the portions of the plates 10 and 20 around the holes 11 and 21 in concentric relation therewith so that the actuator 40 is rotatable about common axis of the holes 11 and 21. The sleeve ring 48 receives therein the control output shaft of the transmission with diametrically opposed keys 49 engaged with corresponding grooves in the control output shaft for drivingly connecting the actuator 40 to the shaft. The switch casing is mounted on the transmission housing by means of bolts extending through holes in the periphery of the casing.

As shown in FIGS. 4 and 5, the base plate 10 and the cover plate 20 are provided respectively with a plurality of fixed contacts 60 to 66 and 70 to 73 which are arranged along circular paths about the rotation axis of the actuator 40 and exposed on the bottom of the recesses 12 and 22. The fixed contacts are integrally connected to individual terminal pins 80 to 86, 90 and 91 through respective bridge segments. The bridge segments are molded in the corresponding plates 10 and 20 so that the fixed contacts and the terminal pins are integrally formed on the base plate 10 and the cover plate 20. As shown in FIG. 4, the base plate 10 includes the fixed contacts responsible for common contact 60, contact 66 for indication of "Parking" position, contact 65 for indication of "Reverse" position, contact 63 for indication of "Drive" position, contact 61 for indication of "Low" position. While, on the other hand, the cover plate 20 includes contact 64 for indication of "Neutral" position, contact 62 for indication of "2nd" position, and a pair of enable contacts 70 and 71 for enabling the starter circuit ST to be energized at "Parking" and a pair of enable contacts 72 and 73 for enabling the starter circuit ST to be energized at "Neutral" position. The common contact 60 and the contacts 61 to 66 are connected through corresponding terminal pins 80 to 86 to individual loads $L_1$ to $L_6$ which are, in this instance, lamps for indication of the positions of the transmission, as shown in FIG. 11. The enable contacts 70, 71, 72 and 73 are arranged to form a parallel pair of contacts which are to be connected through terminal pins 90 and 91 to the starter circuit ST in such an manner that the starter circuit ST is enabled to be energized upon operation of a starter switch SW only when either pair of the contacts is closed in response to the transmission is in either "Parking" or "Neutral" position.

Figure 3:
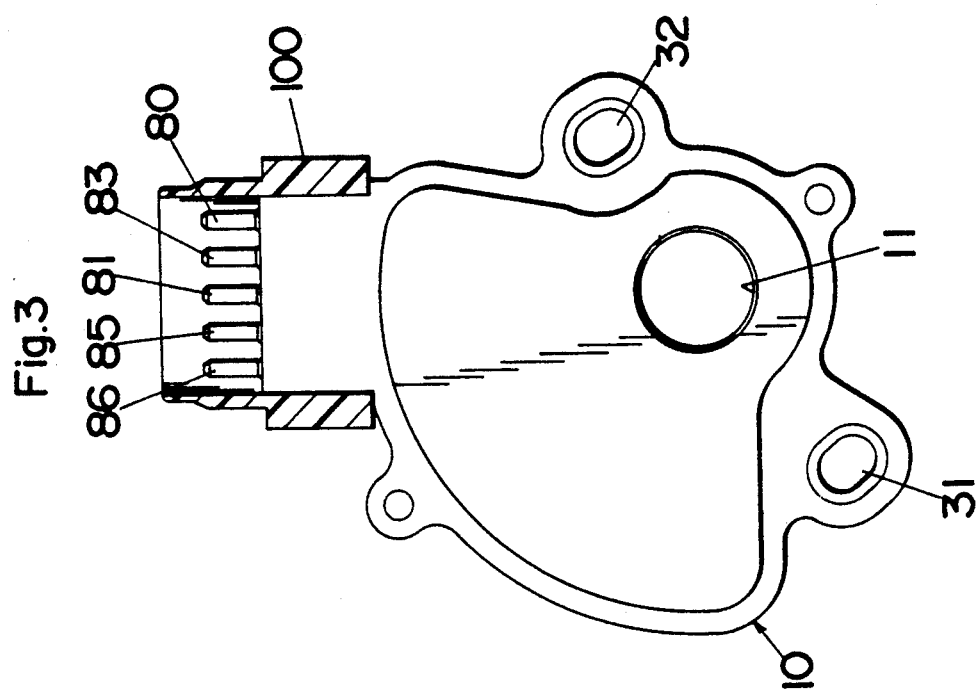
FIG. 3 is a back view of the switch.
Figure 2:
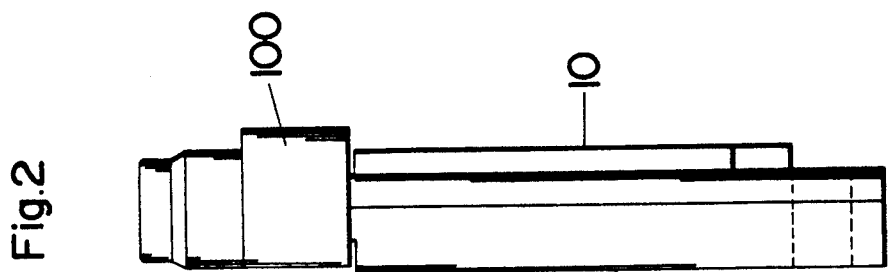
FIG 2 is a side view of the switch.
Figure 1:
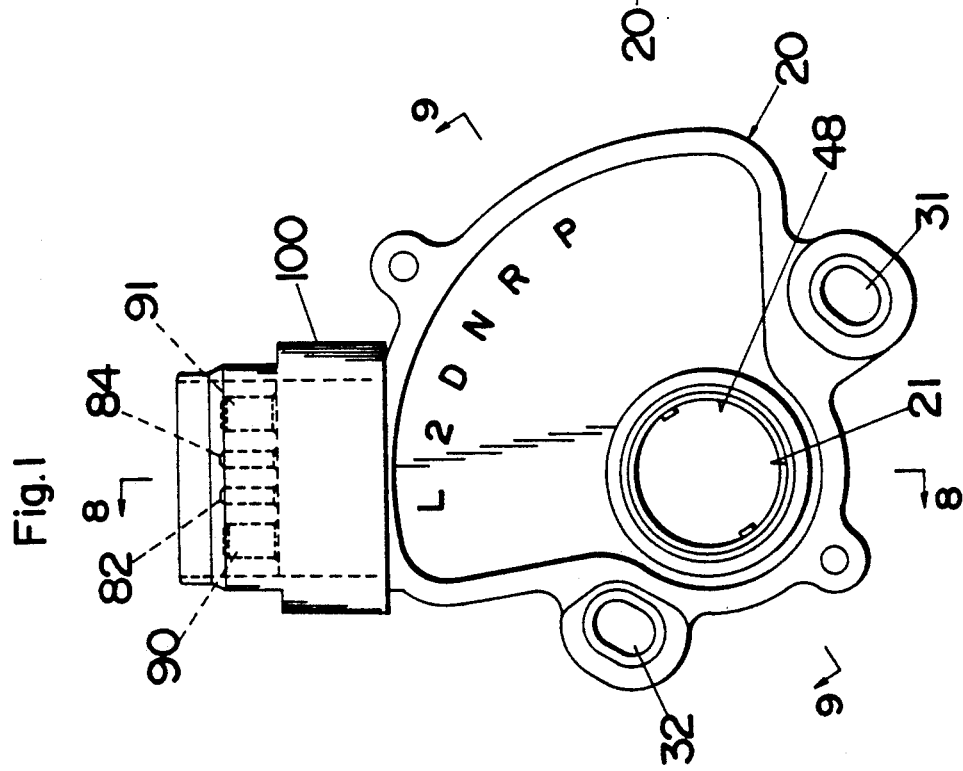
FIG. 1 is a front view of a switch in accordance with a preferred embodiment of the present invention.
Figure 6:
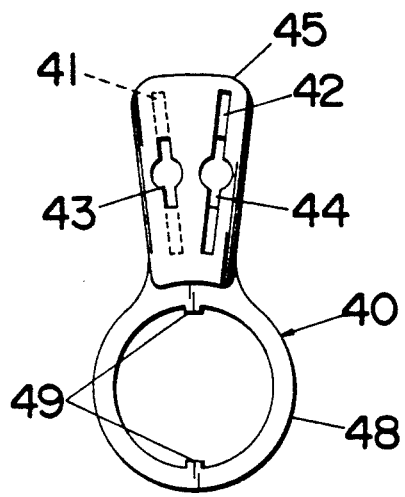
FIG. 6 is a front view of an actuator mounted within the switch.
Figure 7:
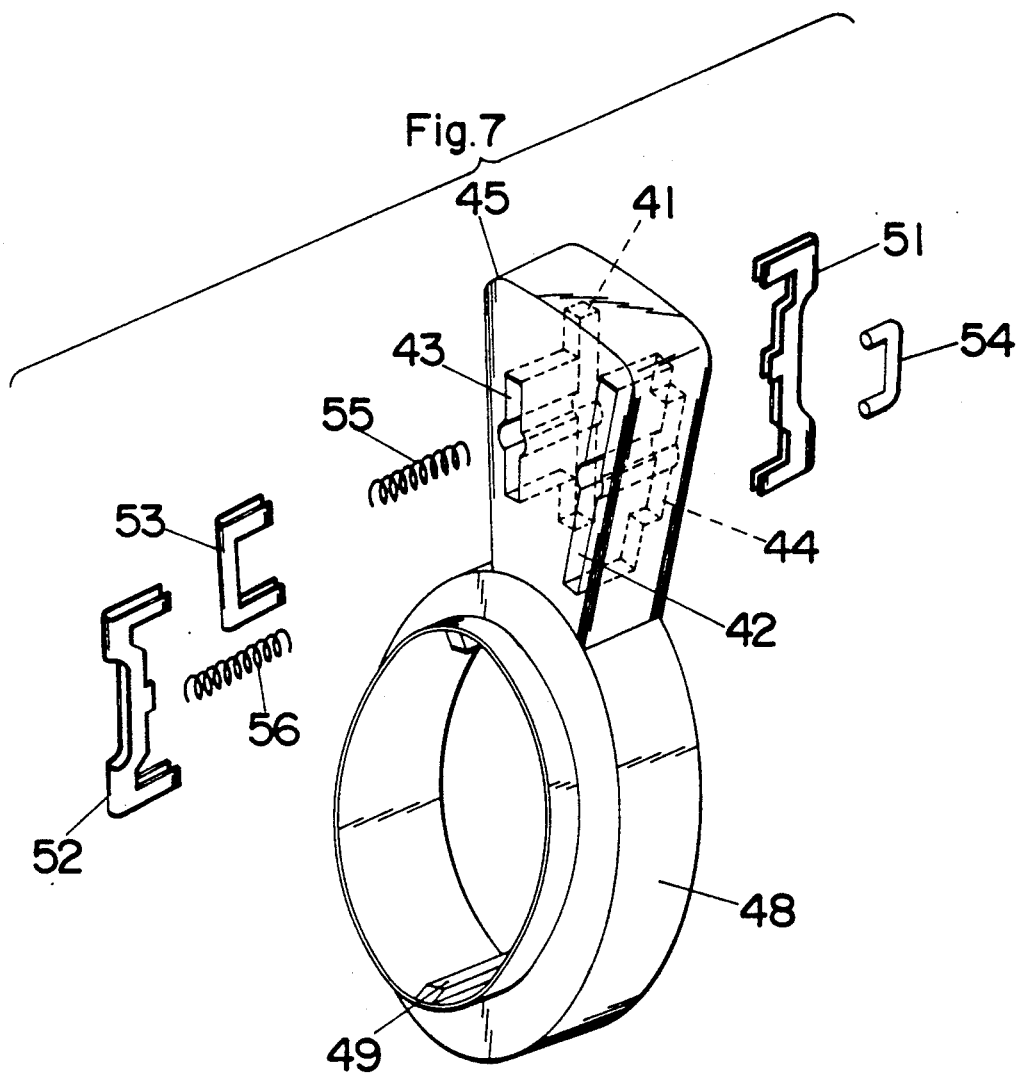
FIG. 7 is an exploded perspective view of the actuator with movable contacts.

As shown in FIGS. 6 and 7, the actuator 40 has a stem 45 which extends radially from the sleeve ring 48 to have an opposed pair of generally flat faces in confronting relation respectively to the interior surfaces of the base plate 10 and the cover plate 20. One face of the stem 45 is formed with first and fourth slots 41 and 44 which are spaced circumferentially about the axis of the sleeve ring 45, with the first slot 41 extending longer than the fourth slot 44. The other face is formed with second and third slots 42 and 43 which are likewise spaced circumferentially and communicate at their lengthwise centers respectively with the fourth and first slots 44 and 41. The secOnd slot 42 is of substantially the same length as the first slot 41 and the third slot 43 is of substantially the same reduced length as the fourth slot 44. The first, second and third slots 41, 42, and 43 receive therein first, second, and third movable contacts 51, 52, and 53, respectively, while the fourth slot 44 receives a click pin 54, as shown in FIG. 9. These movable contacts 51 to 53 and the click pin 54 are urged outwardly by means of coil springs 55 and 56 inserted between the first movable contact 51 and the third movable contact 53 and between the second movable contact 52 and the click pin 54. The coil springs 55 and 56 are received respectively in enlarged holes respectively extending through the first and third slots 41 and 43 and through the fourth and second slots 44 and 42 at the lengthwise centers of the corresponding slots. It is noted at this time that the first and third movable contacts 51 and 53 are electrically interconnected by the coil spring 55 interposed therebetween.

The first movable contacts 51 projecting from the actuator 40 has its opposed ends in engageable relation respectively with the common fixed contact 60 and with a set of circumferentially spaced fixed contacts 61, 63, 65, and 66 provided on the base plate 10 so as to effect conduction between the common contact 60 and one of the contacts 61, 63, 65, and 66 as the actuator 40 rotates about the axis in response to the selected shift position of the transmission. In this instance, when the transmission comes into the "Low" position, the actuator 40 responds to make conduction between the common contact 60 and the contact 61 to thereby energize the corresponding load $L_1$. In the like manner when "Drive", "Reverse", "Parking" positions are selected in the transmission, the actuator 40 will make conduction between the common contact 60 and the corresponding one of the contact 63, 65, or 66, thereby selectively energizing corresponding one of the loads $L_3$, $L_5$, and $L_6$.

The third movable contact 53 projecting from the other face of the actuator 40 is engageable with contacts 62 and 64 circumferentially spaced on the cover plate 20 about the rotation axis of the actuator 40. Since the third movable contact 53 is electrically connected to the first contact 51 which is constantly engaged with the common contact 60, when the actuator 40 rotates into the "2nd" position to have the third contact 53 in contact with the contact 62, conduction is made between the common contact 60 and the contact 62 to thereby energize the corresponding load $L_2$. When the actuator 40 rotates into the "Neutral" position, conduction is made between the common contact 60 and the corresponding contact 64 to energize the load $L_4$. In this manner, the actuator 40 effects conduction between the common contact 60 and the corresponding one of the contacts 61, 62, 63, 64, 65, and 66 in exact coincidence with the positions of the transmission, i.e., "Low", "2nd", "Drive", "Neutral", "Reverse", and "Parking" positions, thereby energizing the corresponding one of the loads $L_1$ to $L_6$.

The second movable contact 52, which projects from the face of the actuator 40 adjacent the third movable contact 53, bridges over the set of contacts 70 and 71 when the transmission is in the "Parking" position and over the set of contacts 72 and 73 when the transmission is in the "Neutral" position. Thus, when the transmission is either in the "Parking" or "Neutral" position, the actuator 40 will make conduction between the corresponding set of contacts so as to enable the energization of the starter circuit ST connected thereto, as shown in FIG. 11. In other positions, the actuator 40 keeps the sets of contacts 70, 71, and 72, 73 in the open condition, disabling the energization of the starter circuit ST.

As shown in FIGS. 4 and 5, the base plate 10 and the cover plate 20 are provided on their interior surfaces respectively with ribs 13 and 23 which extend along the fixed contacts for abutment with the faces of the actuator 40 for smoothly guiding the actuator 40 in its rotating movement.

Figure 10:
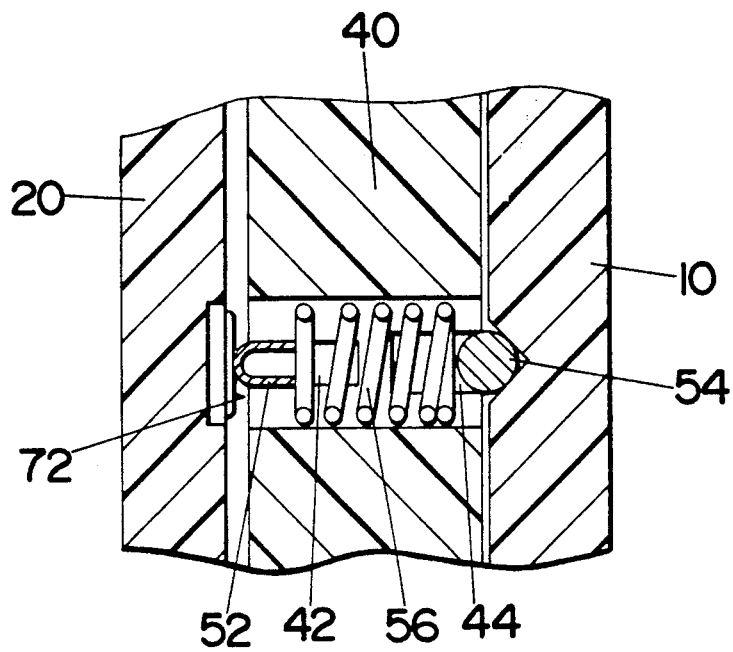
FIG. 10 is a sectional view taken along 10—10 of FIG. 9.

The click pin 54 received in the fourth slot 44 of the actuator 40 is urged by the coil spring 56 into a detent 14 formed in the interior surface of the base 10 in order to releasably latch the actuator 40 in the "Neutral" position. At this "Neutral" position the switch is mounted to the transmission in the "Neutral" position in the manner as described previously for easy position matching between the switch and the transmission. The click pin 54 is of circular cross section as shown in FIG. 10 so that it can readily cam out of the detent 14 of generally V-shaped configuration as the actuator 40 is driven to rotate away from the "Neutral" position. As an alternative to the click pin 54, it is equally possible to use a click ball 54A as shown in FIG. I3 which is a modification of the above embodiment. In either case, the coil spring 56 urging the second movable contact 52 for positive engagement with the corresponding fixed contacts 70 to 73 is commonly utilized to urge the pin 54 or ball 54A into clicking engagement with corresponding detent 14 or 14A.

Figure 12:
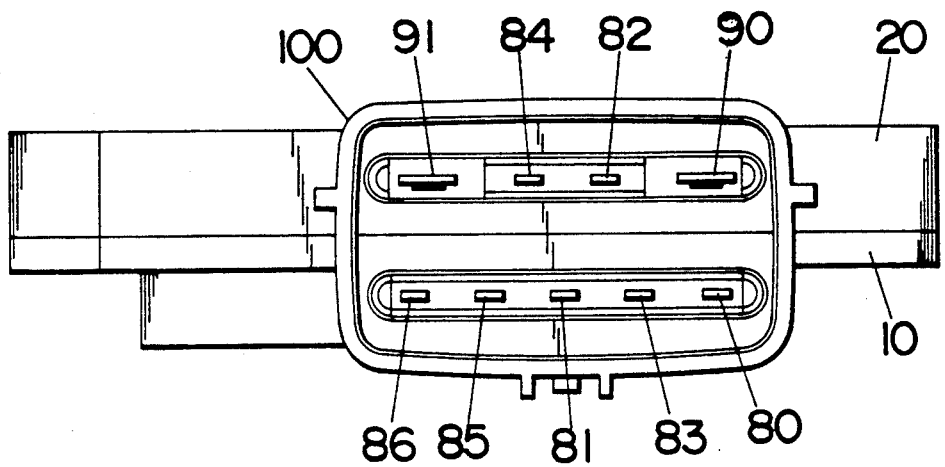
FIG. 12 is a top view of the switch.
Figure 13:
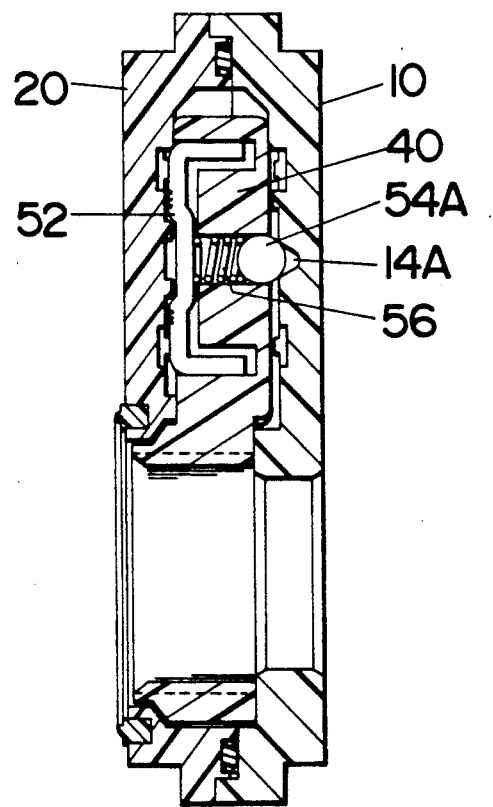
FIG. 13 is a sectional view similar to FIG. 9 but illustrating a modification of the above embodiment.

The terminal pins 80, 81, 83, 84, and 86, which are integrally connected to the fixed contacts 60, 61, 63, 64, and 66, project on the base plate 10 to form a first row in which the pins are evenly spaced. On the cover plate 20, the terminal pins sz. 84, 90, and 91 integrally connected to the fixed contacts 62, 64, and 70 to 73 project to form a second row in which the terminal pins 90 and 91 are positioned at the opposite ends of the row. As shown in FIG. 12, the first and second rows of the terminal pins cooperate to form a terminal set when the base and cover plates 10 and 20 are assembled together for connection with the starter circuit ST and the corresponding loads $L_1$ to $L_6$ of FIG. 11. In the terminal pin arrangement, the terminal pins 90 and 91, which are connected to fixed contacts 70 and 72 and to the fixed contacts 71 and 73, respectively, are of relatively flat configuration to be distinguished from the others and are spaced from the adjacent terminal pins 82 and 84 by a distance which is greater than the distance between the terminal pins 82 and 84 in the second row and that between the adjacent terminal pins 80, 81, 83, 84, and 86 in the first row, thereby assuring enough insulation distance with regard to the terminal pins 90 and 91 which are connected to the starter circuit ST and therefore carry a relatively large current in contrast to the other terminal pins which are connected to the display circuits loads $L_1$ to $L_6$ and therefore carry a relative small current. In this sense, the terminal pins 90 and 91 may be termed as hot pins carrying the relatively large current while the other terminal pins as signal pins carrying the relatively small current. A terminal cover 100 of electrically insulating material is fitted over the ends of the base plate 10 and the cover plate 20 to surround the rows of the terminal pins for receiving a corresponding socket or plug leading to the starter circuit ST and the individual loads $L_1$ to $L_6$.

The switch casing is installed on the transmission housing by suitable bolts extending through bores 31 and 32 provided on the sides of the casing.

What is claimed is:

1. An electrical switch for detecting positions of an automatic transmission of an automobile and controlling correspondingly an electrical circuit in association with the detected position of said transmission, said electrical control switch comprising:

a generally sector shaped switch casing having two radially extending sides defining an apex area and an axially extending opening adjacent said apex area, said casing comprising a pair of base plate and a cover plate each formed from an electrically insulative material, each of said base and cover plates provided in its interior surface with a plurality of circumferentially arranged fixed contacts, said interior surfaces facing each other in the switch casing;

an actuator rotatably supported between said base and cover plates for angular movement about a rotation axis centered about said opening, said actuator being elongated in the radial direction extending from said opening and having a sleeve ring in registration with said opening with means to receive and engage a control output shaft of an automatic transmission, the arrangement being such that the actuator can pivot about the axis of the opening in synchronism with said control output shaft of said automatic transmission which in turn rotates in synchronism with changing positions of said transmission;

said actuator having first and second opposed faces confronting the interior surfaces of said base plate and said cover plate, first and second radially extending movable contacts carried respectively by said first and second faces for electrical conduction between selective ones of said fixed contacts on the respective plates depending upon a particular angular position of said actuator;

a terminal projecting on said switch casing, said terminal comprising a plurality of terminal pins carried by both said base plate and said cover plate and electrically connected respectively to said fixed contacts.

2. An electrical switch as set forth in claim 1, wherein said base plate and cover plates are assembled together to form therebetween a sealed space in which said fixed contacts and said movable contacts are confined.

3. An electrical switch as set forth in claim 1, wherein said terminal pins are integrally connected to said fixed contacts respectively by way of bridging segments which are molded into said base and cover plates.

4. An electrical switch as set forth in claim 3, wherein said terminal pins are arranged in two rows.

5. An electrical switch as set forth in claim 3, wherein said terminal pins comprise signal pins for carrying a relatively small current and hot pins for carrying a relatively large current, said terminal pins being arranged in two rows with a first one of said rows formed only by said signal pins and with a second one of said rows formed by said signal pins and said hot pins, said second row including a total number of signal and hot pins which is less than the number of the signal pins forming said first row such that said hot pins are spaced from the adjacent pin in said second row by a distance greater than that between the adjacent ones of said first pins in said first row.

6. An electrical switch as set forth in claim 5, wherein said hot pins are disposed on the outer ends of said second row.

7. An electrical switch as set forth in claim 1, wherein said actuator and casing includes detent means for maintaining said actuator into one of a plurality of angular positions about the rotation axis.

8. An electrical switch as set forth in claim 1 in which said first and second movable contacts are carried in radially extending slots in the first and second opposed faces of the actuator.

9. An electrical switch as set forth in claim 1 in which the fixed contacts arranged in rows and the positioning of the movable contacts is such that the movable contacts can bridge over at least two rows of the fixed contacts on at least one of said base plate and cover plate.

10. An electrical switch for detecting positions of an automatic transmission of an automobile and controlling correspondingly an electrical circuit in association with the detected position of said transmission, said electrical control switch comprising:

a generally sector shaped switch casing having two radially extending sides defining an apex area and an axially extending opening adjacent said apex area, said casing comprising a pair of base plate and a cover plate each formed from an electrically insulative material, each of said base and cover plates provided in its interior surface with a plurality of circumferentially arranged fixed contacts, said interior surfaces facing each other in the switch casing;

an actuator rotatably supported between said base and cover plates for angular movement about a rotation axis centered about said opening, said actuator being elongated in the radial direction extending from said opening and having a sleeve ring in registration with said opening with means to receive and engage a control output shaft of an automatic transmission, the arrangement being such that the actuator can pivot about the axis of the opening in synchronism with said control output shaft of said automatic transmission which in turn rotates in synchronism with changing positions of said transmission;

said actuator having first and second opposed faces confronting the interior surfaces of said base plate and said cover plate, first and second radially extending movable contacts carried respectively by said first and second faces for electrical conduction between selective ones of said fixed contacts on the respective plates depending upon a particular angular position of said actuator;

a terminal projecting on said switch casing, said terminal comprising a plurality of terminal pins carried by both said base plate and said cover plate and electrically connected respectively to said fixed contacts;

a third movable contact carried the second face of said actuator in angular spaced relation to said second movable contact, said third movable contact being electrically connected to said first movable contact and positioned to engage at least one of said fixed contacts on said cover plate, the arrangement being such that said first and third movable contacts effect electrical conduction between one of the first contacts on the cover plate and one of the fixed contacts on said base plate.

11. An electrical switch as set forth in claim 10, wherein said first and third movable contacts are electrically connected by means of a coil spring which is interposed therebetween for urging said first and third movable contacts against corresponding fixed contacts on the respective plates.

12. An electrical switch as set forth in claim 10, wherein said actuator and casing includes detent means for maintaining said actuator into one of a plurality of angular positions about the rotation axis;

said detent means comprises a spring base projection on said first face in opposite relation to said second movable contact for engagement with a depression formed in said base plate; and said spring biased projection being urged into engagement with said depression by means of a coil spring which is interposed between said projection and said second movable contact.

13. An electrical switch as set forth in claim 12, wherein said projection i in the form of a ball a part of which is used into said depression which is of a generally triangular configuration.

* * * * *